Oct. 28, 1969   H. B. EGLESTON ET AL   3,474,951
CONTAINER CLOSURE

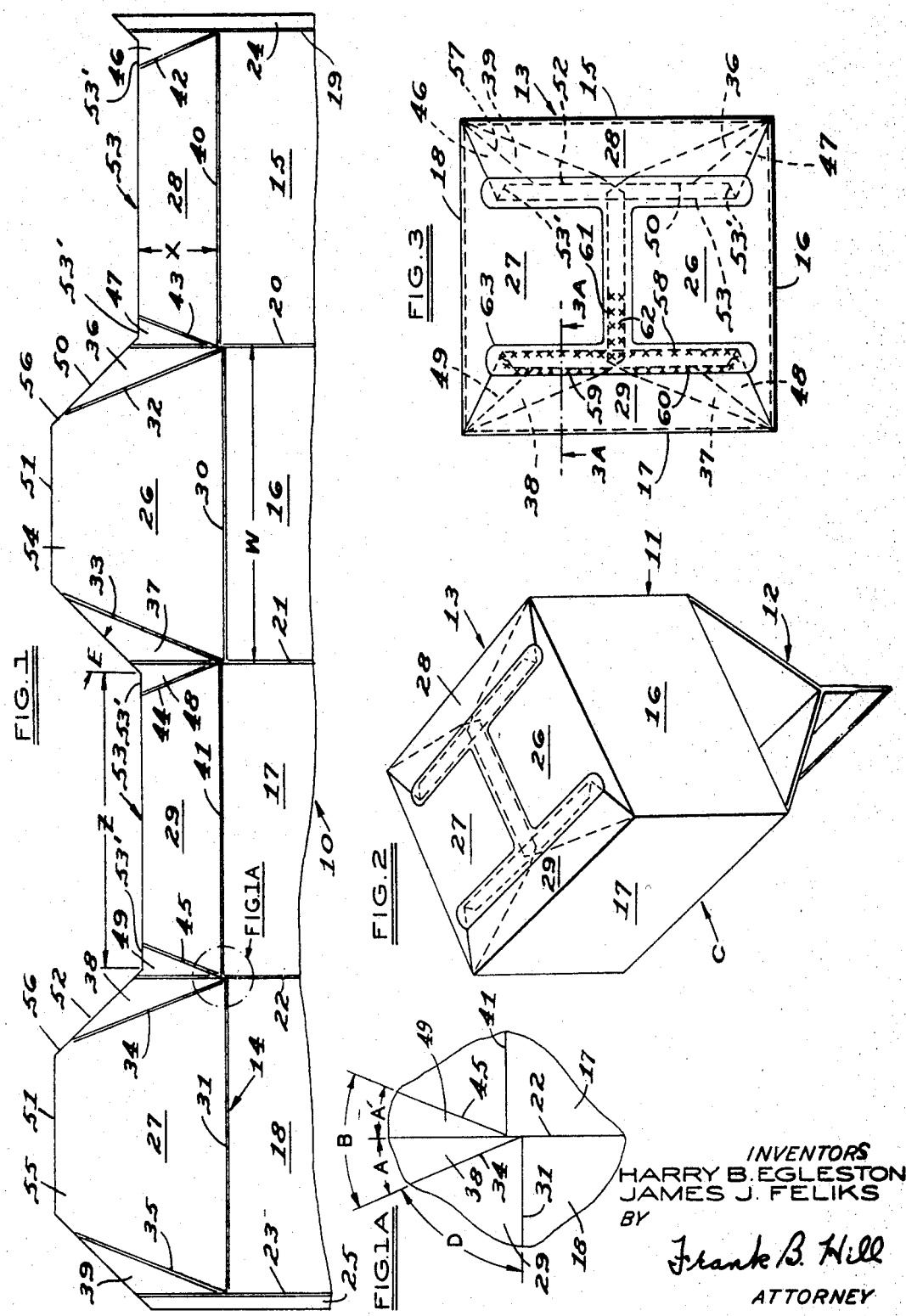

Filed July 19, 1968   4 Sheets-Sheet 2

INVENTORS
HARRY B. EGLESTON
JAMES J. FELIKS

BY Frank B. Hill
ATTORNEY

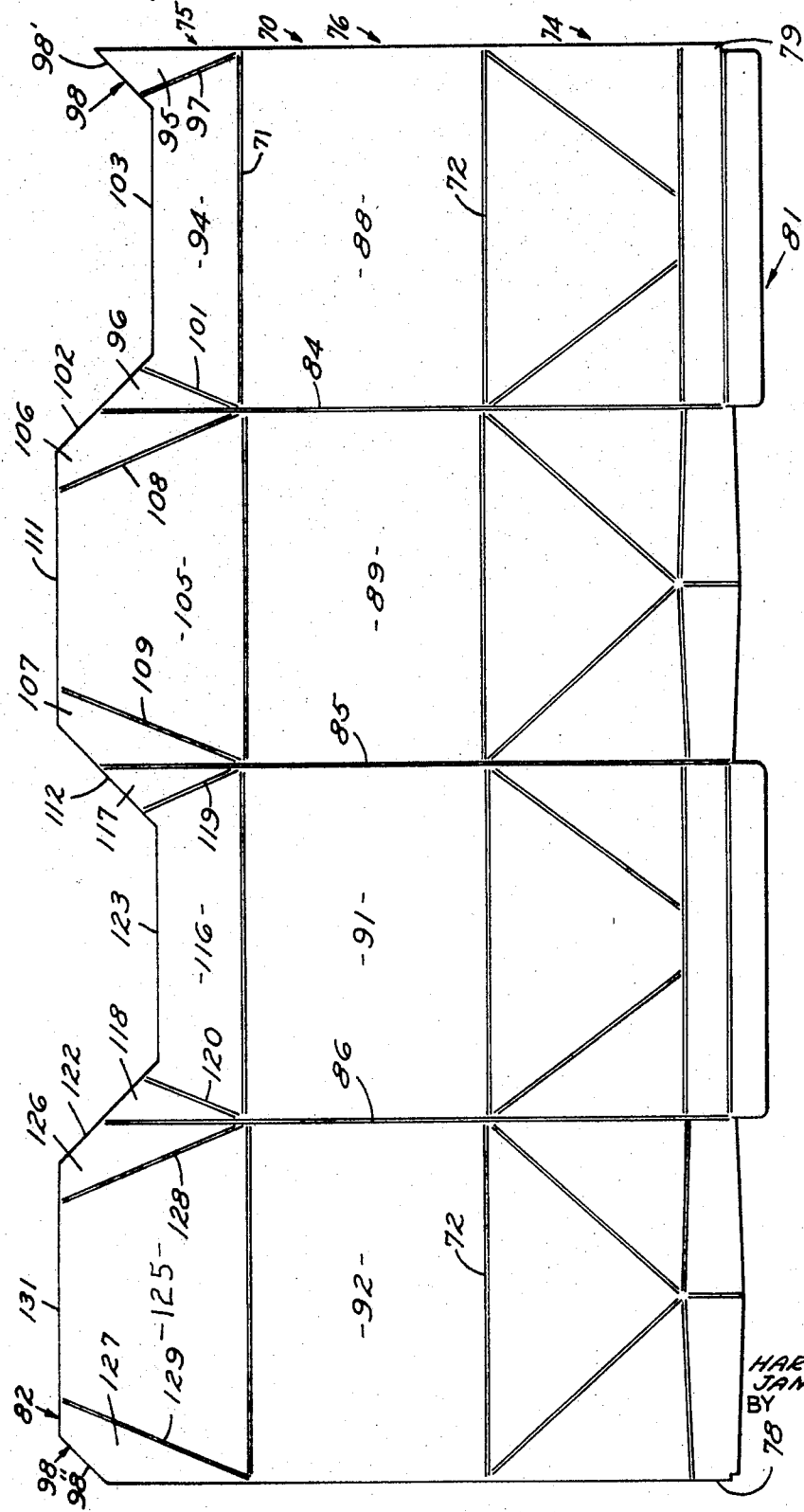

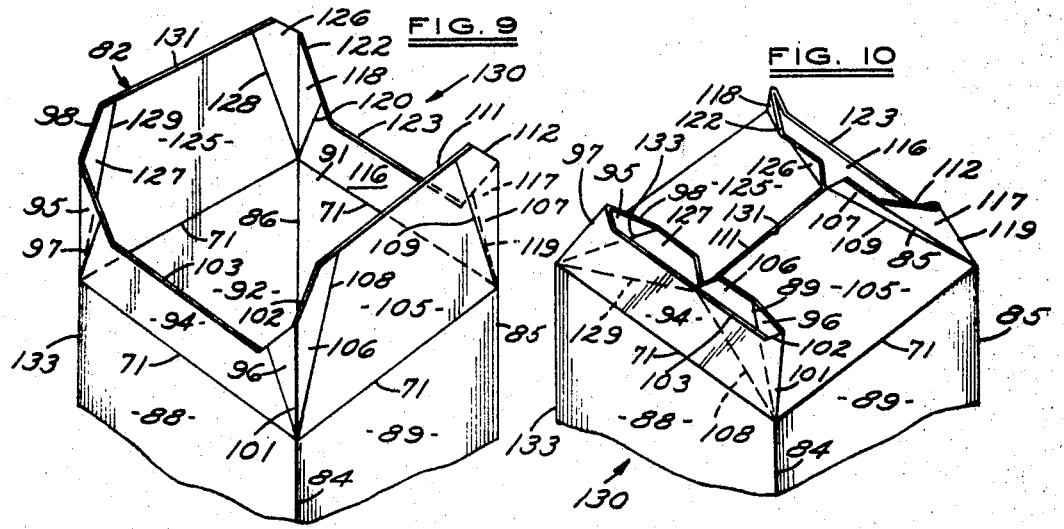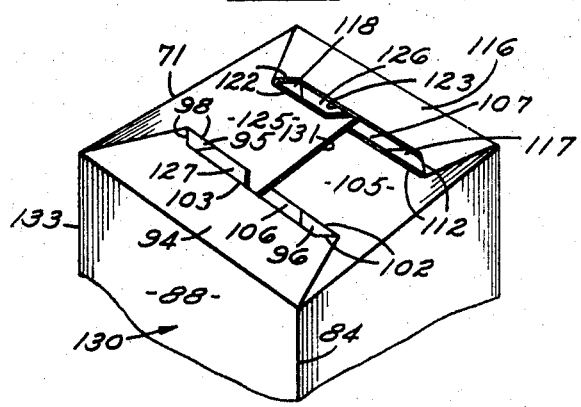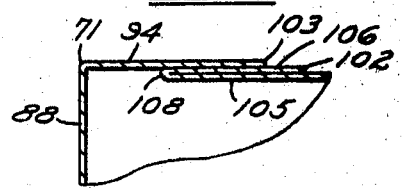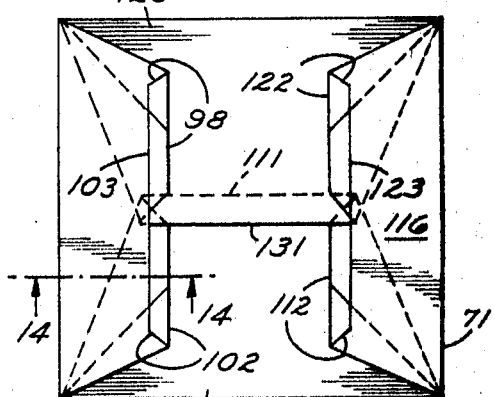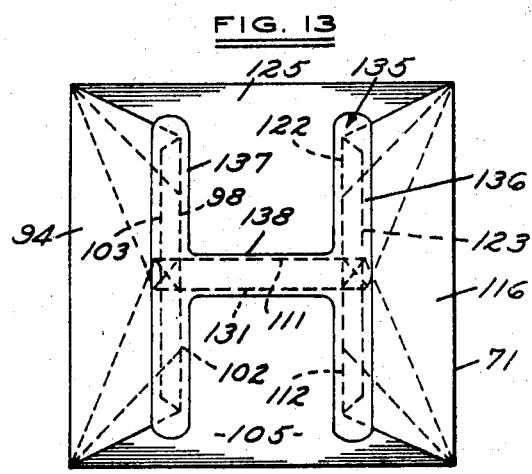

United States Patent Office 3,474,951
Patented Oct. 28, 1969

1

3,474,951
CONTAINER CLOSURE
Harry B. Egleston, Livonia, and James J. Feliks, Walled Lake, Mich., assignors to Ex-Cell-O Corporation, Detroit, Mich.
Continuation-in-part of application Ser. No. 535,241, Mar. 17, 1966. This application July 19, 1968, Ser. No. 746,119
Int. Cl. B65d 5/08, 5/74
U.S. Cl. 229—37                     4 Claims

ABSTRACT OF THE DISCLOSURE

This invention relates to a liquid-tight container bottom closure formed from a thermoplastic sheet material that can be folded and heat-sealed by automatic equipment to provide for weld-sealed joints which require only enough heat to secure two layers of thermoplastic material together.

---

This application is a continuation-in-part application of Ser. No. 535,241, filed Mar. 17, 1966, now United States Letters Patent No. 3,406,892.

The present invention relates to packaging, and more particularly to a container closure formed of thermoplastic sheet material or the like and which can be closed and heat-sealed by conventional automatic equipment used for this purpose.

In the packaging of fluids, extensive use has been made of containers formed of paperboard having an overall coating of thermoplastic film, such as polyethylene, applied on both surfaces of the board. One form of a container of this type just noted and presently in wide commercial use is disclosed in U.S. Patent 3,120,335, issued Feb. 4, 1964.

Although plastic coated containers of the above described type have been commercially successful, there are certain disadvantages in their use, one of the most serious of which involves the exposure of certain of the raw or cut edges of the blank, when formed into a container, to the product. The result is that a liquid product penetrates by a wicking action into the exposed paperboard, with a resultant weakening of the board and eventual failure of the container. Another disadvantage of the present plastic coated container results from the effect of continuous vibration during extended transportation, which can cause a failure of the container bottom by the thin plastic coating developing fatigue cracks. As a consequence, various cost increasing measures, such as the employment of foil or other intermediate barrier layers, and blocking or coating the exposed raw edges, are required to insure a fluid-tight transportable container having substantial shelf life.

It is, therefore, one object of the present invention to provide a container fold-in closure formed from a thermoplastic sheet material that can be effectively heat-sealed.

A further object of the invention is to provide a new and improved liquid-proof container bottom closure formed of thermoplastic sheet material which will be strong, simple to erect, close and seal, and susceptible of high volume economical machine production for packaging liquid products.

Still another object is the provision of a novel container bottom closure construction having its fold-in panels so designed that they can be automatically closed and heat-sealed wherein the flow pattern of weld material is confined within the peripheral limits of the container.

A still further object of the invention is the provision of a container bottom closure construction wherein no more than two surfaces are required to be heat-sealed together at any one location to attain a liquid-tight seal.

Another further object of this invention is the provision of a container bottom closure constructoin wherein all surfaces are weld-sealed together to form a liquid-tight end closure wherein no more than two surfaces are necessary to be bonded together and all weld seals or bonds are visible from the outside of the bottom end closure.

Another object of this invention is the provision of a container bottom closure construction wherein all surfaces are weld-sealed together to form a liquid-tight end closure wherein no more than two surfaces are necessary to be bonded together and all weld seals or bonds are visible from the inside of the bottom end closure.

Another object of this invention is the provision of a fold-in container bottom closure construction having a minimum of material.

Other objects and advantages of the present invention will become apparent as the following description proceeds, taken in connection with the accompanying drawings, wherein:

FIG. 1 is a layout view of a portion of a container blank from which the closure of the instant invention is formed showing the outside surface thereof.

FIG. 1A is an enlarged view of the portion of FIG. 1 within the dashed circle.

FIG. 2 is a perspective view of an inverted gable top container showing the bottom end closure erected from the blank of FIG. 1.

FIG. 3 is a plan view of the container bottom of FIG. 2.

FIG. 8 is a layout view of a portion of a container blank from which the closure of the present invention is formed showing the principles of the present invention and the outside surface thereof.

FIG. 9 is a perspective view illustrating a side seam open and container formed from the blank illustrated in FIG. 8.

FIG. 10 is a perspective view and illustrates the relationship of the various bottom closure panels as the container illustrated in FIG. 9 is initially started toward its closed position.

FIG. 11 is a prespective view illustrating the container disclosed in FIG. 10 after the bottom closure panels have been moved to their closed position before weld seals have been made to secure the bottom end closure in its closed position.

FIG. 12 is a bottom plan view of the present container as illustrated in FIG. 11 and showing the under surfaces in phantom to better illustrate the principles of the present invention.

FIG. 13 is a plan view of the bottom closure after the same has been weld-sealed in its final form, illustrating the relationship of the underlying surfaces in phantom.

FIG. 14 is an enlarged partial sectional view illustrating the relationships of the various bottom closure panels and taken along the line 14—14 of FIG. 12.

Figures 4, 5:
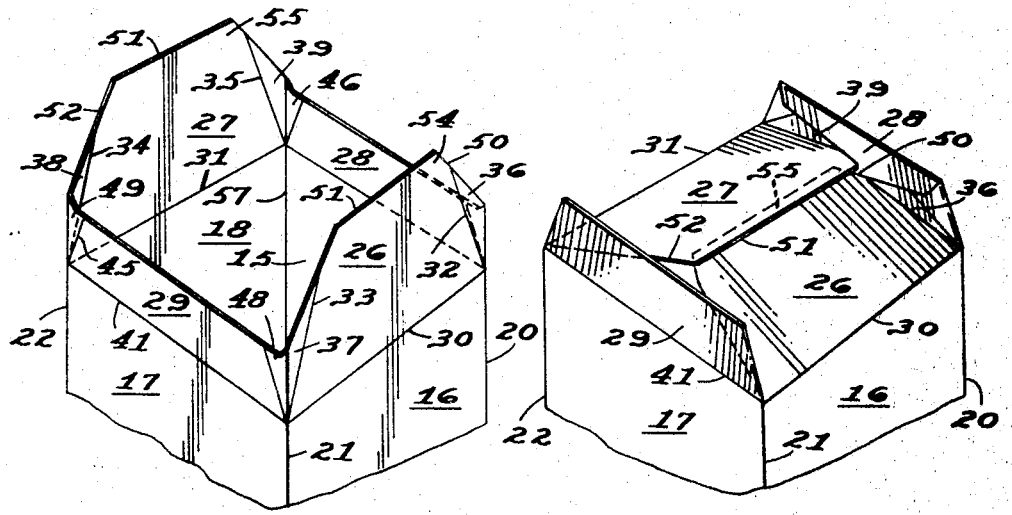
FIGS. 4, 5 and 6 are fragmentary perspective views illustrating, sequentially, various steps in forming the bottom closure of the container of FIG. 2.

Referring now to the drawings, FIG. 2 generally indicates a thermoplastic container C having a bottom closure made in accordance with the principle of the present invention. The container described in this application is made from high density polyethylene, but it should be understood that other suitable thermoplastic sheet material, such as polyvinyl chloride, polyvinyl acetate, vinyl copolymers, polypropylene, polystyrene, cellulose acetate and cellulose acetate butyrate may be employed without departing from the spirit and scope of the invention.

Referring more specifically to FIG. 1, the container bottom is shown as a fragmentary blank 10 with a pattern of appropriate score lines nad having the outside surface of the blank showing. The bottom closure layout of FIG. 1 is adapted to be erected into the completed container closure of FIG. 2. The container C includes a tubular body 11, which in the present instance is of substantially square cross-section. One end of the body 11 is provided wtih a suitable top closure 12 which may, for example, be of the familiar gable top end closure as disclosed in copending application of Harry B. Egleston, Ser. No. 534,257 filed Jan. 6, 1966 and now United States Letters Patent No. 3,389,849, the details of which are of no concern here.

The flat bottom closure 13 is shaped from the blank of FIG. 1, which is separated into two groups of panels by a staggered score line generally indicated at 14. The material above score line 14 is the bottom closure group, while the portion below the score line 14 is the body group and comprises four panels 15–18. The body group is defined with the panels being separated by score lines 19–23.

It will be noted that each of the side seam panels 24, 25 extend longitudinally the entire height of blank 10 in the same manner as a conventional side seam flap as shown, for example, in the copending application of Elwyn R. Gooding, Ser. No. 474,869, filed July 26, 1965, now United States Letters Patent No. 3,334,802. In the present embodiment of the invention, the container C is formed by first being side seamed. This can be accomplished by having panels 15 and 16, and flap 24, folded about score line 21 until their inside surfaces contact the inside surfaces of panels 18, 17 and flap 25 respectively. The coincident side edges formed by scores 19 and 23 of the panels 15 and 18 can be simultaneously cut from their associated flaps 24 and 25 and heat-sealed by the use of a "hot knife" or radiant hot wire to form a side seam. The blank 10 is then opened into tubular form, substantially square in cross-section as seen in FIG. 4.

It is to be understood that applicants invention is not limited to any particular method of side seaming; and other methods using separate cutting and heat sealing operations could be employed. The sealing phase could be accomplished by other heating methods, such as rotary-type continuous heat bar sealers or impulse sealers. Also, the utilization of ultrasonic infrared and dielectric sealing methods are within the contemplation of the instant invention.

While applicants bottom closure is preferably formed from a blank that has been edge-sealed without any overlap, other arrangements, such as a form of the conventional side seam flap utilized, for example, in plastic coated cartons of the type shown in U.S. Patent 3,120,335, could be used and still embody the principles of the invention.

As can be seen in FIG. 1 the alternate side panels 16, 18 have respectively connected therewith substantially trapezoidal shaped major extension panels 26, 27. These major panels are joined along their larger bases at individual score lines 30, 31 to their respective side panels 16, 18. Each of the trapezoidal extension panels 26, 27 is flanked at its sides along respective angular score lines 32, 33 and 34, 35 by a plurality of triangular corner rib panels 36, 37 and 38, 39.

The alternate side panels 15, 17 have respectively connected therewith substantially trapezoidal shaped minor extension panels 28, 29. These minor extension panels are joined along their larger bases by individual score lines 40, 41 to their respective side panels 15, 17. Each of the trapezoidal minor panels is flanked on its sides along respective pairs of angular score lines 42, 43 and 44, 45 by trapezium shaped panels 46, 47 and 48, 49.

Thus, the triangular panel 36 and the trapezium panel 47 are hinged together along score line 20, the panels 37, 48 are hinged together along score line 21, while the panels 38, 49 are hinged together along score line 22. The panels 39, 46 are hinged together along the previously discussed side seams, generally referred to as thermofused joints 57, as viewed in FIG. 4, formed at the juncture of the blank scores 19 and 23. It will be noted in FIG. 1 that the extension of the scores 20, 21 and 22 to the upper edge of the blank 10 is accomplished for the convenience of forming the tube of FIG. 4 on a machine mandrel, and they are not utilized during the fold-in sequence shown in FIGS. 5 and 6.

The angular score lines 32, 33, 34, 35 are disposed relative to the longitudinal scores 20, 21, 22, 23 respectively, the angle being delineated by the letter A in FIG. 1A for the score 34. In the instant embodiment, the angle A is approximately 22½°, and its complementary angle of 67½° is shown at D. It will be noted in the enlarged FIG. 1A that the score line 34 intersects the horizontal score 31 substantially at its juncture with the vertical score line 22.

The score lines 42, 43, 44, 45 are angularly disposed relative to longitudinal scores 19, 20, 21, 22 respectively, the angle being delineated by the letter A'. In the instant embodiment the angle A' is again approximately 22½° so that the sum of angles A and A', represented by the letter B, is 45°. It will similarly be noted in enlarged FIG. 1A that the horizontal score line 41 intersects the score line 45 substantially at its juncture with the vertical score line 22. The vertical offset between individual staggered scores 31 and 41 will vary, depending upon the thickness of the sheet plastic used for various size containers. For example, applicants one-half pint container, using a sheet material of approximately 15 mils, will provide an offset within the range of 1/32 inch. The purpose of this staggered scoring is to accommodate the thickness of the plastic as it is formed along the score lines when the container is erected, and thus prevent crowding of the plastic at the various corner junctions of the score lines.

The panels 26, 27 are mirror images of each other and have corresponding pairs of free edges 50 and 52 which are angularly disposed relative to the vertical, the angle being approximately 45° and indicated at E in FIG. 1. It will be noted that the pairs of edges 50 and 52 intersect the horizontal free edges 53 of blank 10 at points such that their length, represented by the letter Z, is less than the width of the body panels 15–18 indicated generally by the dimension W. The portions 53' of each edge 53 are equal in length and form the fourth leg 46, 47, 48, 49 of the trapezium fold-back panels of the completed closure 13. The minor panels 28, 29 are similarly mirror images of each other and have a height dimension represented at X which is approximately one-quarter the panel dimension W.

In the case of major panels 26, 27 it will be observed that they are cut and scored essentially in a trapezoidal configuration. The major panel 26 has an extended tuck-in flap 54 and major panel 27 has an extended overlying or outside overlap flap 55. The end portions of the flaps 54, 55 are relieved or chamfered at 56 for ease of infolding. While the angle of chamfer is shown as being 45° to agree with the angle E of edge pairs 50 and 52, it will be observed that the flap edges could be formed at various angles.

Figures 6, 7:
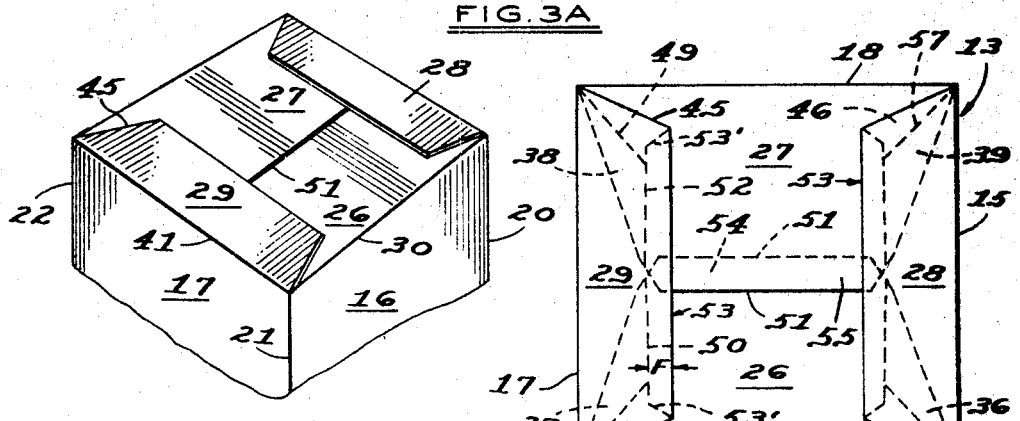
FIG. 7 is a plan view of the closure as viewed in FIG. 6.

When the container C is assembled from the blank 10, the panel edges 19 and 23 are joined together along the thermofused joint 57 in a manner such as described above and erected into a tube of substantially square cross-section (FIG. 4). The manner in which the bottom panels close the container is shown in FIGS. 5 and 6. Together, the major panels 26, 27 are folded inward toward each other. The folding occurs at the lateral scores 30, 31 and the folding scores 32, 33, 34 and 35. In turn, the minor panels 28, 29 are moved towards each other. This causes the generally trapezium shaped foldback member (bounded by the scores 45, 34 and the free edges 52 and 53') constituting the individual panel members 38, 49 to rotate around score line 45 so that the inside surfaces of member 38, 49 and panel 29 are brought together. At the same time and during the same movement member 38, 49 is rotating around score line 34, thus the outside surfaces of member 38, 49 and panel 27 are brought together. Fold-back members 36, 47; 37, 48; and 39, 46 make the same movements as member 38, 49 with panels 28–26, 29–26 and 28–27 respectively. Bottom closure major panel 26 moves towards bottom closure major panel 27 just enough faster than panel 27 moves towards panel 26 so that tuck-in flap 54 is positioned beneath overlap flap 55. FIG. 6 shows the bottom when completely closed preparatory to being heat sealed.

It has been the practice with prior fold-in bottom arrangements to require a preheat of the closure panels before they are finally folded or sealed because of the superimposed three or more layers of closure folds. This is because with moderate heating temperatures layers consisting of two-ply become welded, but greater multiple layers do not. By increasing the heating temperature, multiple layers can be welded but may, as a result of the increased temperature to which the thermoplastic is submitted, develop pimpled deformations, or even fuse altogether so that holes appear in the packaging envelope.

Figure 3A:
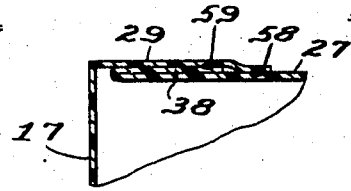
FIG. 3A is an enlarged cross section taken on the line 3A—3A of FIG. 3.

In the instant invention, only when the bottom closure is completed, as viewed in FIG. 6, is it subjected to pressure and heat. The enlarged FIG. 7 indicates the substantially parallel relationship between free edges 50, 52 and their associated minor panel edge 53, which is offset therefrom by an amount indicated by the letter F. As shown in FIG. 3, the end of minor panel 29 is fused to the outer surface of major panels 26, 27 by heat seal 58; the end of panels 38, 49 and 37, 48 are fused to the inner surface of panel 29 by heat seals 59 and 60, respectively, and the free edges of the flaps 54, 55 are fused to the inner and outer surfaces of the panels 27 and 26 by heat seals 61 and 62 respectively, thus forming a liquid-tight closure. As the heat seal pattern (FIG. 3) is identical for the right half of the closure, only the seals on the left half have been shown. The closure of the instant embodiment was made by subjecting the above mentioned superimposed portions of the thermoplastic material to a temperature of about 225° F. to 250° F. for about one second.

An advantage of applicants closure design is that the overlying panels may be heat-pressure sealed by a heating element or die having a generally H-shaped design corresponding generally to the outline shape of the zone 63 in FIG. 3. By virtue of this design a controlled zone of heat can be applied, together with pressure to cause the plastic material to flow in the regions of zone 63. The ability of applicants to attain a sound weld results from the closure design which requires only the outer two layers of sheet material depth to be welded together at any single location. As a result, a constant heat amount can be transmitted to the entire zone 63 for simultaneously thermofusing all of applicants closure lap-seals, such that all the seals have approximately the same shear strength. Further, the fold-in closure 13 is not only formed using a minimal amount of material, but the heat zone 63 insures that there will be no objectional overhand of fused material after the heat sealing operation.

An example of sizes and dimensions that could be used would be a liquid half-pint container having a width of panel 16, the distance from the middle of score line 20 and the middle of score line 21, of 2.764 inches and all other panels 15, 17 and 18 equal to panel 16. The distances from the middle of score line 30 to the edge 51 being 1.500 inches and the distance from the middle of score line 40 to the edge 53 being .688 inch. The height of the panels 16 and 18 being 1.875 inches, while the height of panels 15 and 17 will be .062 of an inch greater due to the equal offsets of .031 of an inch of their horizontal scores at each end.

As is evident from the foregoing discussion, the container closure of this invention may be also used with polymeric material in the form of a seamless tube, as well as two separate sheets having, for example, two thermofused joints coextensive with opposite corners such as 21 and 57 of FIG. 4.

Referring generally to FIG. 8, an alternate embodiment incorporating the principles of the present invention are disclosed in the form of a container blank generally referred to by numeral 70. The container blank 70 is separated into three sections by staggered score lines 71 and 72. As viewed in FIG. 8, the portion below staggered score line 72 is a top closure group or a top closure section 74. The portion of the container blank above staggered score line 71 is a bottom closure group or a bottom closure section 75. The portion of the container blank 70 between the staggered score lines 71 and 72 is a wall panel group or a body section 76.

The sides of the container blank 70 are defined by two side seam edges 78 and 79. The top and bottom of the container blank 70 are defined by top edge 81 and bottom edge 82, respectively. The container blank 70 is separated into substantially four panels by the side seam edges 78 and 79 and vertical score lines 84, 85 and 86. The body section 76 provides four side wall or panel members 88, 89, 91 and 92. The top closure section 74 will not be discussed in detail as it is of no concern in the present invention. However, it is thoroughly discussed in United States Letters Patent No. 3,389,849 as stated above.

The portion of the top closure section 75 above panel 88 has a minor panel 94 which is connected to a pair of triangular panels 95 and 96. The triangular panel 95 is formed by an angular score line 97 and an angular edge 98' which is a portion of an angular edge 98 as will be explained in more detail below. The triangular panel 96 is formed by an angular score line 101 and a portion of an angular edge 102. The minor panel 94 is provided with a minor edge 103 which is substantially parallel to staggered score line 71 and a smaller distance than one half the width of panel 88. The angular edges 98 and 102 intersect the minor edge 103 past the intersection with angular score lines 97 and 101, respectively. The full purpose and function of this intersection will be explained in more detail below.

The portion of the bottom closure section 75 above panel 89 is major extension panel 105. The major extension panel 105 is connected to a pair of trapezium corner rib panels 106 and 107 by a couple of angular score lines 108 and 109, respectively. A major edge 111 is substantially parallel to staggered score line 71 and forms that portion of bottom edge 82 along major extension panel 105. As viewed in FIG. 8 the distance between major edge 111 and the staggered score line 71 is over one half the width of panel 89. The trapezium corner rib panel 106 is defined by angular edge 102, score line 84, angular score line 108 and major edge 111. The trapezium corner rib panel 107 is formed by an angular edge 112, major edge 111, angular score line 109 and score line 85.

The bottom closure section 75 above panel 91 is represented by a minor panel 116 which is connected to a pair of triangular panels 117 and 118 by a couple of angular score lines 119 and 120, respectively. The triangular panel 117 is defined by score line 85, angular edge 112 and angular score line 119. The triangular panel 118 is defined by an angular edge 122 and angular score line 120 and score line 86.

The minor panel 116 has a minor edge 123 which is substantially parallel to the staggered score line 71 and intersects angular edges 112 and 122 to form the remaining bottom edge 82 portion of minor panel 116.

Both these intersections are towards the middle of the minor panel 116 and on the center side of angular score lines 119 and 120 with respect to score lines 85 and 86, respectively.

The bottom closure section 75 above panel 92 is a major extension panel 125 which is connected to a pair of trapezium corner rib panels 126 and 127 by a couple of angular score lines 128 and 129, respectively. The upper edge of the major extension panel 125 is defined by a major edge 131 which is substantially parallel to the staggered score line 71. The trapezium corner rib panel 126 is defined by score line 86, angular score line 128, major edge 131 and angular line 122. The trapezium corner rib panel 127 is defined by side seam edge 78, angular score line 129, major edge 131 and angular edge 98" which is part of angular edge 98 as will be explained in more detail below.

When the container blank 70 is put together in the shape of a tubular body or container, as illustrated in FIG. 9, it is indicated generally by numeral 130. The body section 76 of tubular body 30 will have its panels 88 across from panel 91 and panel 89 across from panel 92, and the side seam edges 78 and 79 will be in contact and a side seam weld, generally referred by numeral 133, can be utilized to join them as explained in detail above. At this time the angular edges 98' and 98" will be joined together to form the angular edge 98 which is a portion of the bottom edge 82.

FIG. 9 shows the container 130 with the bottom closure section 75 in an open ended bottom form as it would appear when the panel members 88, 89, 91 and 92 have been squared up. When the open end of the container 130 is to be closed the bottom closure section 75 will have it various panels moved to form a closed bottom position after which heat seals will be performed on the various portions as will be explained in detail below. The container 130, as illustrated in FIG. 10, shows the inner relation between the various bottom closure section 75 panels when the container end is started to be closed.

Referring generally to the inner action by the minor panel 94 and major extension panel 105, we can discuss the movement of the trapezium corner rib panel 109 and the triangular panel 96 which will be typical of the various corner portions of the bottom closure section 75 of container 130.

When the initial closing is started in this embodiment the major extension panels 105 and 125 will be moved towards each other, as illustrated in FIG. 10. In this particular example major extension panel 105 will be moved wards major extension panel 125 at a greater rate so that major edge 111 will pass under major edge 131. The trapezium corner rib panel 106 and the triangular panel 96 will move about angular score line 101 and start moving behind onto the underside of the minor panel 94 to form a co-planar surface between the minor panel 94 and the major extension panel 105. When the container's bottom closure section 75 has been completely closed, it will appear as indicated in FIGS. 11 and 12 and the angle and length of angular edge 102 along with the corresponding angular edges 98, 112 and 122 will determine the distance angular edges 102 and 98 will be spaced from minor edge 103 and the distance that angular edges 112 and 122 will be spaced from minor edge 123 when the bottom closure section 75 is closed by the location of the inner section between minor edges 103 with angular edges 98 and 102 in relationship to the angular score lines 97 and 101 and the same relationship betwen the corresponding parts for minor panel 116 and its minor edge 123.

Generally referring to FIG. 12, to form a liquid-tight bottom the edges which must be welded to surfaces are edge 98 to major extension panel 125 and its short distance running to minor edge 103, minor edge 103 along trapezium corner rib panel 106 and triangular panel 96 and triangular panel 95 and trapezium corner rib panel 127 and a short distance along major extension panel 125. Then the major edge 131 can be welded to the various surfaces which it contacts between minor edge 103 to minor edge 123. The same welding will have to take place between the angular edges 112, 122 and minor edge 123 as just explained for the corresponding edges on the opposite side of the container 130.

Referring to FIG. 14, we can see how the present structure leaves a space between the minor edge 103 and the angular edge 102 which is reflected along the trapezium corner rib panel 106. This can be accomplished by utilizing just enough heat to weld two surfaces together. It has been found in actual use that heat required to bond more than a two-layer thickness tends to cause melt holes in the various surfaces and/or unsightly appearance.

This sealing action is reflected by an H seal 135 as viewed in FIG. 13. The two leg portions of the H seal 135 are represented by heat seals 136 and 137 which act on edges 112, 122, 123 and 98, 102, 103, respectively. The cross-bar of the H seal 135 which connect the two leg portions is reflected by heat seal 138 which will act on major edge 131 to bond it to major extension planel 105.

It should also be noted at this time that because the double layer or two sheet thickness heat is utilized, that the major edge 111 will also be bonded to the bottom or lower portion of the major extension panel 125. Thus a liquid-tight end closure will be formed and all the necessary edges which are required to be weld-sealed will be accomplished and their relative positions will be visible from one side of the container bottom.

It can easily be seen that with the movement of the various parts as just explained, if instead of moving major extension panels 105 and 125 towards each other first, we were to move minor panels 94 and 116 towards each other first, the bottom closure section 75 would be formed just the opposite as it presently appears. Then FIG. 12 would appear as the container 130 would look on the inside instead of on the outside. Thus, depending upon the use and purpose, this bottom structure can be used either with the minor panels 94 and 116 positioned over the major extension panels 105 and 125 or under them.

While the invention is susceptible of various modifications and alternative constructions, certain illustrative container closures have been shown in the drawings and described above in detail. It should be understood, however, that there is no intention to limit the invention to the specific forms disclosed. On the contrary, the intention is to cover all modifications, alternative constructions, equivalents and uses falling within the spirit and scope of the invention as expressed in the appended claims.

Other modes of applying the principles of our invention may be employed instead of those explained, change being made as regards the article and combinations herein disclosed, provided the features stated be any of the following claims or the equivalent of such stated features be employed.

We, therefore, particularly point out and distinctively claim as our invention:

1. A blank for a container made of thermoplastic material comprising:
   (a) a top closure section, a bottom closure section and a body section;
   (b) a first score line dividing said bottom closure section from body section, said first score line extending for the full width of said blank;
   (c) a second panel score line, a third panel score line and a fourth panel score line dividing said body section into four panels, said second, third and fourth anel score lines being substantially perpendicular to said first score line extending the full height of said blank;
   (d) said second, third and fourth side panel scores dividing said bottom closure section into pairs of major extension and minor panels alternately connected to said panels as extensions thereof;

(e) said major extension and minor panels connected to their adjacent panel at said first score line and have a free edge away from said first score line;

(f) said major extension panels having a pair of corresponding trapezium corner rib panels;

(g) each of said trapezium corner rib panels having one side formed by one side of a major extension panel, a second side formed by one of said panel score lines, and third and fourth sides by the free edge of said bottom closure section;

(h) said minor panels having a pair of corresponding triangular panels;

(i) each of said triangular panels having one side formed by one side of a minor panel, a second side formed by a wall panel score line, and a third side in alignment with the free edge of the adjacent trapezium corner rib panel;

(j) said minor panels having minor edges which are substantially parallel to said first score line and are a distance from it less than one half the width of their adjacent panels; and (k) said major panels having major edges which are substantially parallel to said first score line and at least one major edge is a distance from said first score line equaling more than one half the width of its adjacent panel.

2. A blank for a container according to claim 1, wherein:

(a) the intersection of said third side of said triangular panel and its said associated minor edge is between its side formed by its minor panel and the middle of said minor panel.

3. A bottom closure section for a tubular container made from thermoplastic sheet material having:

(a) a tubular body defined by four substantially rectangular panels;

(b) said bottom closure section connected to and extending from said panels;

(c) said bottom closure section having first and second major extension panels extending from two opposed panels;

(d) said bottom closure section having first and second minor panels extending from the two remaining opposed panels;

(e) a pair of triangular panels connected to each of said minor panels;

(f) a pair of trapezium corner rib panels connected to each of said major extension panels;

(g) each of said trapezium corner rib panels is connected to one of said triangular panels;

(h) said major extension and minor panels extend over the bottom end of said container;

(i) at least one of said major extension panels extend over one half of the distance across the bottom end of said container;

(j) said minor panels extend less than one half the distance across the bottom end of said container;

(k) said trapezium corner rib panels and said connected triangular panels form a co-planar surface positioned between the major extension and minor panels and the edges of the co-planar surfaces are positioned a predetermined distance from the end edge of said minor panels;

(l) first heat seal is placed along the end of one of said major extension panel welding its end to the other major extension panel;

(m) second and third heat seals are placed along the ends of each minor panel welding them to the associated co-planar surfaces and are connected to said first heat seal;

(n) fourth and fifth heat seals are placed along the edges of two of the said co-planar surfaces and each connects to one end of said second heat seal;

(o) six and seventh heat seals are placed along the edges of said two remaining co-planar surfaces and each connects to one end of said third heat seal to form a liquid-tight bottom end closure; and (p) said edges of said minor panels are positioned between the end edge of said co-planar surfaces they are associated with and the panel said minor panel is connected to.

4. A bottom closure section for a tubular container made from thermoplastic sheet material having:

(a) a tubular body defined by four substantially rectangular panels;

(b) said bottom closure section connected to and extending from said panels;

(c) said bottom closure section having first and second major extension panels extending from two opposed panels;

(d) said bottom closure section having first and second minor panels extending from the two remaining opposed panels;

(e) a pair of triangular panels connected to each of said minor panels;

(f) a pair of trapezium corner rib panels connected to each of said major extension panels;

(g) each of said trapezium corner rib panels is connected to one of said triangular panels;

(h) said major extension and minor panels extend over the bottom end of said container;

(i) at least one of said major extension panels extend over one half of the distance across the bottom end of said container;

(j) said minor panels extend less than one half the distance across the bottom end of said container;

(k) said trapezium corner rib panels and said connected triangular panels form a co-planar surface positioned between the major extension and minor panels and the edges of the co-planar surfaces are positioned a predetermined distance from the end edge of said minor panels;

(l) first heat seal is placed along the end of one of said major extension panel welding its end to the other major extension panel;

(m) second and third heat seals are placed along the ends of each minor panel welding them to the associated co-planar surfaces and are connected to said first heat seal;

(n) fourth and fifth heat seals are placed along the edges of two of the said co-planar surfaces and each connects to one end of said second heat seal;

(o) six and seventh heat seals are placed along the edges of said two remaining co-planar surfaces and each connects to one end of said third heat seal to form a liquid-tight bottom end closure;

(p) said major extension and minor panels are connected to and extend substantially across the ends of their panels along a substantially straight first score line;

(q) said major extension panels are provided with a pair of substantially straight angular second score lines forming acute angles with said first score line and starting substantially at side edges of said panels and extending inwardly;

(r) four substantially straight parallel third side score lines forming the side edges of said panels and extend to the free edges of said bottom closure section;

(s) said third score lines are substantially perpendicular to said first score line;

(t) one of said third score lines and one of said angular second score lines of said major extension panels form one of said trapezium corner rib panels with the bottom edge of said bottom closure section;

(u) said minor panels are provided with a pair of substantially straight fourth angular minor panel score lines forming acute angles with said first score line and starting substantially at side edges of said side walls and extending inwardly;

11

(v) one of said third score lines and one of said fourth angular minor panel score lines form one of said triangular panels on said minor panels with the free edge of said bottom end closure;

(w) one of said connected trapezium panels and one of said triangular corner rib panels acting with a common third side score line form one of said co-planar surfaces;

(x) said free edge of said bottom closure section has an angular edge as one edge of said tri-angular panel and part of the edge of said minor panel and a minor edge as part of said minor panel, and as one edge of said trapezium; and

12

(y) said angular edge and said minor edge intersect between said fourth angular minor panel score line and the middle of said minor panel.

References Cited

UNITED STATES PATENTS

| 2,358,124 | 9/1944 | Zinn | 229—37 |
| 2,596,225 | 5/1952 | Eaton | 229—37 |
| 3,029,997 | 4/1962 | Kauffeld | 229—37 |

DAVID M. BOCKENEK, Primary Examiner

U.S. Cl. X.R.

229—17, 3.5